United States Patent
Jang et al.

(10) Patent No.: US 7,850,182 B2
(45) Date of Patent: Dec. 14, 2010

(54) METHOD OF MANUFACTURING CONTROL ARM USING VARIABLE CURVATURE EXTRUDING PROCESS AND DOUBLE-HOLLOW-TYPED CONTROL ARM MANUFACTURED THEREBY

(75) Inventors: Gyewon Jang, Gyeonggi-do (KR); Woosik Lee, Gyeonggi-do (KR); Daeup Kim, Gyeonggi-do (KR); Byungcheol Park, Daegu (KR); Kaehee Oh, Daejeon (KR)

(73) Assignees: Hyundai Mobis Co., Ltd., Seoul (KR); Hwashin Co., Gyeongsangbuk-do (KR); Dongyang Gangchul Co., Ltd., Daejeon (KR)

( * ) Notice: Subject to any disclaimer, the term of this patent is extended or adjusted under 35 U.S.C. 154(b) by 111 days.

(21) Appl. No.: 12/205,091

(22) Filed: Sep. 5, 2008

(65) Prior Publication Data

US 2009/0072506 A1  Mar. 19, 2009

(30) Foreign Application Priority Data

Sep. 14, 2007  (KR) ...................... 10-2007-0093624
Sep. 17, 2007  (KR) ...................... 10-2007-0094122

(51) Int. Cl.
*B60G 3/04* (2006.01)
(52) U.S. Cl. .............................................. 280/124.134
(58) Field of Classification Search .......... 280/124.134; 72/254
See application file for complete search history.

(56) References Cited

U.S. PATENT DOCUMENTS 6,810,586 B1 *  11/2004  Waaler et al. .............. 29/897.2
6,843,490 B2 *   1/2005  Raidel et al. .......... 280/124.116
2004/0021288 A1 *   2/2004  Raidel et al. .......... 280/124.177
2005/0099060 A1   5/2005  Choi
2005/0274213 A1  12/2005  Kim
2006/0033300 A1   2/2006  Shin
2006/0033303 A1   2/2006  Shin
2006/0070481 A1   4/2006  Kim
2007/0040345 A1 *   2/2007  Hardtke et al. ........ 280/124.164
2008/0224435 A1 *   9/2008  Holt ...................... 280/124.11

FOREIGN PATENT DOCUMENTS

KR    10-2007-0105142    10/2007
KR         10-0829457     5/2008

OTHER PUBLICATIONS

English language Abstract of KR 10-2007-0105142, Oct. 30, 2007.
English language Abstract of KR 10-0829457, May 7, 2008.

* cited by examiner

*Primary Examiner*—Faye M. Fleming
(74) *Attorney, Agent, or Firm*—Greenblum & Bernstein, P.L.C.

(57) ABSTRACT

According to the invention, in extrusion molding of a control arm of aluminum, control arm is manufactured by a variable curvature extruding process that simultaneously form straight sections and a curved section in extruding a raw material, without pressing forming that is accompanied by solution heat-treatment for forming a carrier fastening end and a bush fastening end at both ends of control arm. Therefore, since the press forming that is required in the extrusion molding of control arm is removed, the manufacturing process is simplified and the manufacturing cost is reduce. Further, the entire extrusion profile cross section of control arm has a double-hollow closed cross section to distribute loads, such that durability of a load-concentrated portion of control arm is increased and the loads can be more effectively distributed.

7 Claims, 3 Drawing Sheets

METHOD OF MANUFACTURING CONTROL ARM USING VARIABLE CURVATURE EXTRUDING PROCESS AND DOUBLE-HOLLOW-TYPED CONTROL ARM MANUFACTURED THEREBY

CROSS-REFERENCE TO RELATED APPLICATIONS

The present application is based on, and claims priority from, Korean Application Serial Numbers 10-2007-0093624 and 10-2007-0094122, filed on Sep. 14, 2007 and Sep. 17, 2007, the disclosures of which are hereby incorporated by reference herein in its entirety.

FIELD OF THE INVENTION

The present invention relates to a control arm, particularly a method of manufacturing a control arm using a variable curvature extruding process, without bending by a press, and a double-hollow-typed control arm manufactured by the method.

BACKGROUND OF THE INVENTION

In general, a suspension system prevents a vehicle from jolting due to vibration accompanied by a noise that is generated by roughness of the road while the vehicle travels.

The suspension system commonly includes a spring, a shock absorber, a stabilizer, and a control arm and improves a comfortable ride and stability of the vehicle by making three functions of adjusting a spring coefficient, a damping force, and the vehicle height.

Further, the control arm of the components of the suspension system is transversely disposed in the vehicle, that is, of which an end is fastened to a knuckle (or carrier) of a wheel through a bush and the other end is fastened to a cross member (or subframe) through a bush, such that it has rigidity against inward/outward loads as well as the forward/backward loads of the vehicle, which are transmitted through the knuckle of the wheel.

The control arm is generally made of a steel, but, at present, it tends to be made of aluminum that is useful to structural products for the most stable physical properties and is manufactured by extrusion molding for the properties of the aluminum.

For example, in order to connect an extruded straight-hollow aluminum member that has undergone cold bending to the carrier (to wheel) and to the subframe (to car body), a control arm is bent and then molded by a press to fasten a bush and a carrier. Thereafter, a hole is formed through the control arm molded in a control arm shape and the bush is assembled.

However, according to the extrusion molding of the control arm of aluminum, since the extruded straight member should undergo bending and molding, for example, a process to secure good molding of the member by solution heat-treatment before molding is required to prevent breakage when forming a bush fastening portion and a carrier fastening portion, the manufacturing process becomes complicated and the manufacturing cost relatively increases.

In particular, since extruding and bending processes that are earlier process for machining the raw material of aluminum are separated, more time is required for extrusion molding and productivity to the entire manufacturing process decreases.

SUMMARY OF THE INVENTION

Embodiments of the present invention help overcome the drawbacks in the related art and it is an object of the invention to simplify the manufacturing process of a control arm and save the manufacturing cost by applying a variable curvature extruding process, which does not need bending using a press, when manufacturing a control arm of aluminum by extrusion molding.

It is another object of the invention to increase the durability at a load-concentrated portion of the control arm and more effectively distribute the load by forming the entire extrusion profile cross section of the control arm in a double structure having a double-hollow closed cross section to distribute the load while manufacturing the control arm of aluminum using the variable curvature extruding process that does not need molding by a press.

A method of manufacturing a control arm using variable curvature extruding process according to the invention includes: variable curvature extrusion molding that forms a hollow raw control arm of aluminum into a curved control arm having a front straight extrusion section that is longitudinally formed straight, a rear straight extrusion section that is formed straight at the opposite side, and a joint extrusion section that connects the front straight extrusion section with the rear straight extrusion section and has a predetermined curvature, while controlling the extrusion speed and the extrusion temperature of the raw control arm, and the pre-heat temperature of a billet; trimming that forms an earlier control arm from the curved control arm by forming a closed cross section with double walls in a body plate that is provided under a base plate where a bump stop cup is placed, using the curved control arm, and forming a carrier fastening end and a bush fastening end at both ends; and assembling that forming a final control arm having a finished product shape by forming a machining control arm for assembling a bush and the bump stop cup from the earlier control arm and then fitting the bush into the machining control arm and assembling the bump stop cup of a suspension system where a spring is placed.

The carrying speed of a traverse that extrudes the raw control arm is controlled at 30 mm/s in the variable curvature extrusion molding, the pre-heat temperature of the extrusion billet is maintained at 490° C. or more, and the temperature at an extrusion outlet is maintained within 530° C. to 545° C. to prevent the extrusion speed of the raw control arm from falling in the variable curvature extrusion molding.

The curvature of the joint extrusion section of the raw control arm is in the range of 600 R to 700 R in the variable curvature extrusion molding.

A double-hollow type control arm manufactured by variable curvature extrusion molding according to the invention includes a base plate, a body plate, a carrier fastening end, and a bush fastening end. The base plate is connected with a bump stop cop, where the lower end of a spring is placed, by caulking. The body plate integrally protrudes from the base plate and has a closed hollow profile cross section with double walls therein, which is formed by a main cavity having a closed inner space and left and right cavities formed at left and right sides from the main cavity to have the same width. The carrier fastening end is composed of a pair of flanges that extend from the body plate and are spaced apart from each other when the base plate is not connected. The bush fastening end is composed of a pair of flanges that are spaced apart from each other and formed by integral connection of the base plate and the body plate at the opposite side to the carrier fastening end.

Further, slopes are further formed at lower end of the outer sides of the left and right cavities that form both sides of the main cavity to incline both outer sides of the body plate.

Further, the main cavity has the same width as the width of the bush fastening end formed at an end of the control arm and the width between left and right side cavities including the main cavity is the same as the width of the carrier fastening end formed at the opposite side to the bush fastening end of the control arm.

Further, a main reference thickness of the walls separating the main cavity from the left and right cavities is smaller than a reference thickness of the outer walls of the left and right cavities, and rounded-connecting portions with the base plate of the left and right cavities have a thickness smaller than the outer walls opposite to the base plate of the left and right cavities.

According to the invention, since a control arm of aluminum is manufactured by extrusion molding without bending by a press, the manufacturing process of control arms having the same specification and the manufacturing cost is decreased.

Further, according to the invention, since the extrusion profile cross section of the control arm of aluminum has a double structure having a double-hollow closed cross section to distribute the load, it is possible to increase the durability and distribute the load at the load-concentrated portion of the control arm.

BRIEF DESCRIPTION OF THE DRAWINGS

For better understanding of the nature and objects of the present invention, reference should be made to the following detailed description with the accompanying drawings, in which.

DETAILED DESCRIPTION OF THE PREFERRED EMBODIMENTS

Embodiments of the invention are described hereafter in detail with reference to the accompanying drawings, but theses embodiments are just examples and can be achieved in various modifications by those skilled in the art. Therefore, the present invention is not limited to the embodiments.

Figure 1:
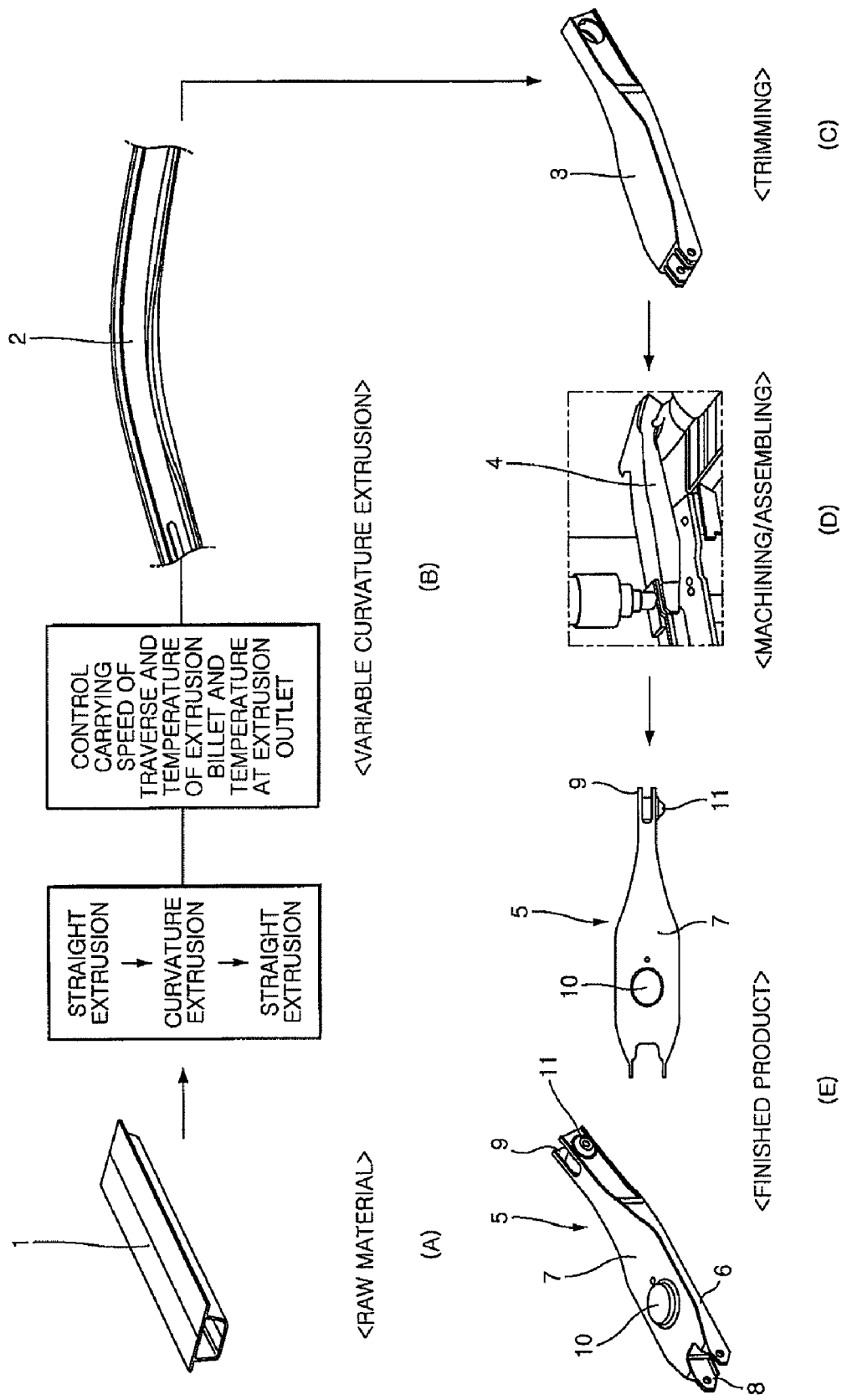
FIG. 1 is a flowchart illustrating a method of manufacturing a control arm using a variable curvature extrusion process according to the invention.

Referring to FIG. 1 showing a flowchart illustrating a method of manufacturing a control arm using variable curvature extrusion according to the invention, the invention is to manufacture a control arm 5 of a suspension system by extrusion-molding an aluminum member, in which a carrier-fastening end 8 and a bush-fastening end 9 are formed at both ends to fasten an end to a carrier (to wheel) and the other end to a subframe (to car body). Further, the control arm is formed in a double structure of which a hollow extrusion profile cross section has a double-hollow closed cross section to distribute loads while a bump stop cup 10 where the lower end of a spring of the suspension system is placed is connected by cauking.

In control arm 5, bush-fastening end 9 is fastened to the car body through a bush 11 and carrier-fastening end 8 is fastened by bolts and nuts.

According to the extrusion molding of the aluminum control arm, the control arm is manufactured by a variable curvature extruding process that simultaneously forms a straight portion and a curved portion when extruding a raw material, without separately bending the raw material using a press.

The variable curvature extruding process uses a variety of methods, for example, according to a process of manufacturing an aluminum control arm using the variable curvature extrusion process, as shown in FIGS. 1A and 1B, an aluminum billet is pre-heated and a hollow extrusion mold having a control arm cross sectional structure is provided. Thereafter, a raw control arm 1 is extruded by a traverse device to have a variable curve.

In this operation, raw control arm 1 sequentially undergoes straight extrusion molding, curvature extrusion mold, and straight extrusion molding.

Figure 2:
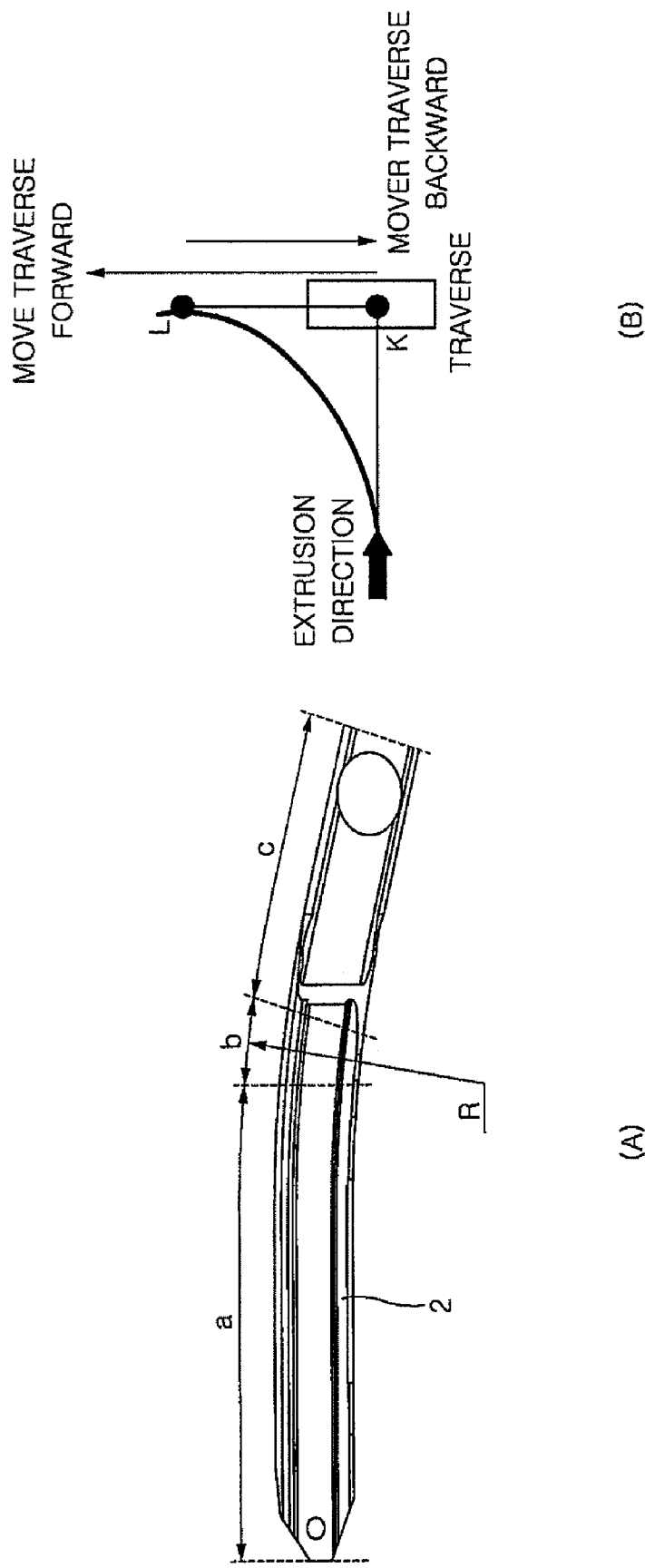
FIG. 2A and 2B are views illustrating molding a double-hollow-typed control arm where the variable curvature extruding process according to the invention is applied.

The variable curvature extruding of raw control arm 1 by the traverse is made by reciprocating the traverse forward and backward (directions of L and K), as shown in FIGS. 2A and 2B, and in this process, the temperature of the extrusion billet and the temperature at the extrusion outlet are controlled to control the carrying speed of the traverse and prevent reduction of the extrusion speed.

The traverse is a common extruding molding device that is used in extrusion of the control arm.

It is important to control the carrying speed of the traverse in the molding process, and for example, wrinkles are made on raw control arm 1 to be extruded, when the carrying speed of the traverse is high, whereas the curve of raw control arm 1 is uncompleted and productivity is reduced as well when the carrying speed of the traverse is low. Therefore, the carrying speed of the traverse is controlled at about 30 mm/s in the variable curvature extruding process.

Further, because it is important to control the temperature of the extrusion billet and the temperature at the extrusion outlet to prevent the extrusion speed of raw control arm 1 from falling, the pre-heat temperature of the extrusion billet is maintained at 490° C. or more and the temperature at the extrusion outlet is maintained within 530° C. to 545° C.

Raw control arm 1 manufactured by the variable curvature extruding process while the carrying speed and temperatures are controlled, as shown in FIG. 2A, has a front straight extrusion section (a) that is longitudinally formed straight and a rear straight extrusion section (c) that is formed straight at the opposite side, and a joint extrusion section (b) that connects front straight extrusion section (a) with rear straight extrusion section (c) is formed to have a predetermined curvature.

This extruding process is convenient because a bending process using a press is not required.

The curvature (R) of joint extrusion section (b) is in a range of 600 mm to 700 mm.

Next, after forming a control arm 2 having front straight extrusion section (a), joint extrusion section (b) having curvature (R) of 600 mm or more, and rear straight extrusion section (c) by applying variable curvature extruding process to raw control arm 1, as shown in FIG. 1C, an earlier control arm 3 is formed by applying a trimming process to control arm 2 having the curvature.

Carrier fastening end 8 and bush fastening end 9 are formed at both end of the control arm by applying the trimming process to earlier control arm 3.

As carrier fastening end 8 and bush fastening end 9 are formed at both end of the control arm as described above, earlier control arm 3 having entirely the same shape as the control arm proceeds to a step for a machining control arm 4, as shown in FIG. 1D, and then a control arm 5 having a finished product shape is finally formed.

That is, in the step for machining control arm 4, a bush 11 is fitted in bush fastening end 9 of machining control arm 4, a hole is bored through the body of machining control arm 4 to combining bump stop cup 10 where the spring of suspension system is placed, and then bump stop cup 10 is assembled.

By fastening bush 11 to machining control arm 4 and assembling bump stop cup 10 as described above, a final product having the shape and structure of control arm 5 is completed as shown in FIG. 1E.

Control arm 5 completed through the processes has the entire extrusion profile cross section of a double structure having double-hollow closed cross section to distribute loads and the extrusion profile cross section is formed through the variable curvature extruding process and the trimming process for forming earlier control arm 3.

That is, as completed control arm 5 shown in FIG. 1E, bump stop cup 10 where the lower end of the spring is placed is integrally formed with a base plate 7, an upper surface, which is connected by caulking while a body plate 6 of which the inner profile cross section has a double-hollow closed cross section. Further, base plate 7 and body plate 6 are integrally connected and carrier fastening end 8 and bush fastening end 9 that are each composed of a pair of flanges spaced apart from each other are formed at both ends.

The control arm of aluminum has the double-hollow profile cross section formed by the extruding process and carrier fastening end 8 and bush fastening end 9 at both ends as described above, the width of carrier fastening end 8 and bush fastening end 9 depends on the double-hollow profile cross section in the extruding process.

In the forming of the control arm, body plate 6 is formed to protrude from the bottom of base plate 7 such that the width is smaller than base plate 7 while forming the double closed profile cross section therein.

Figure 3:
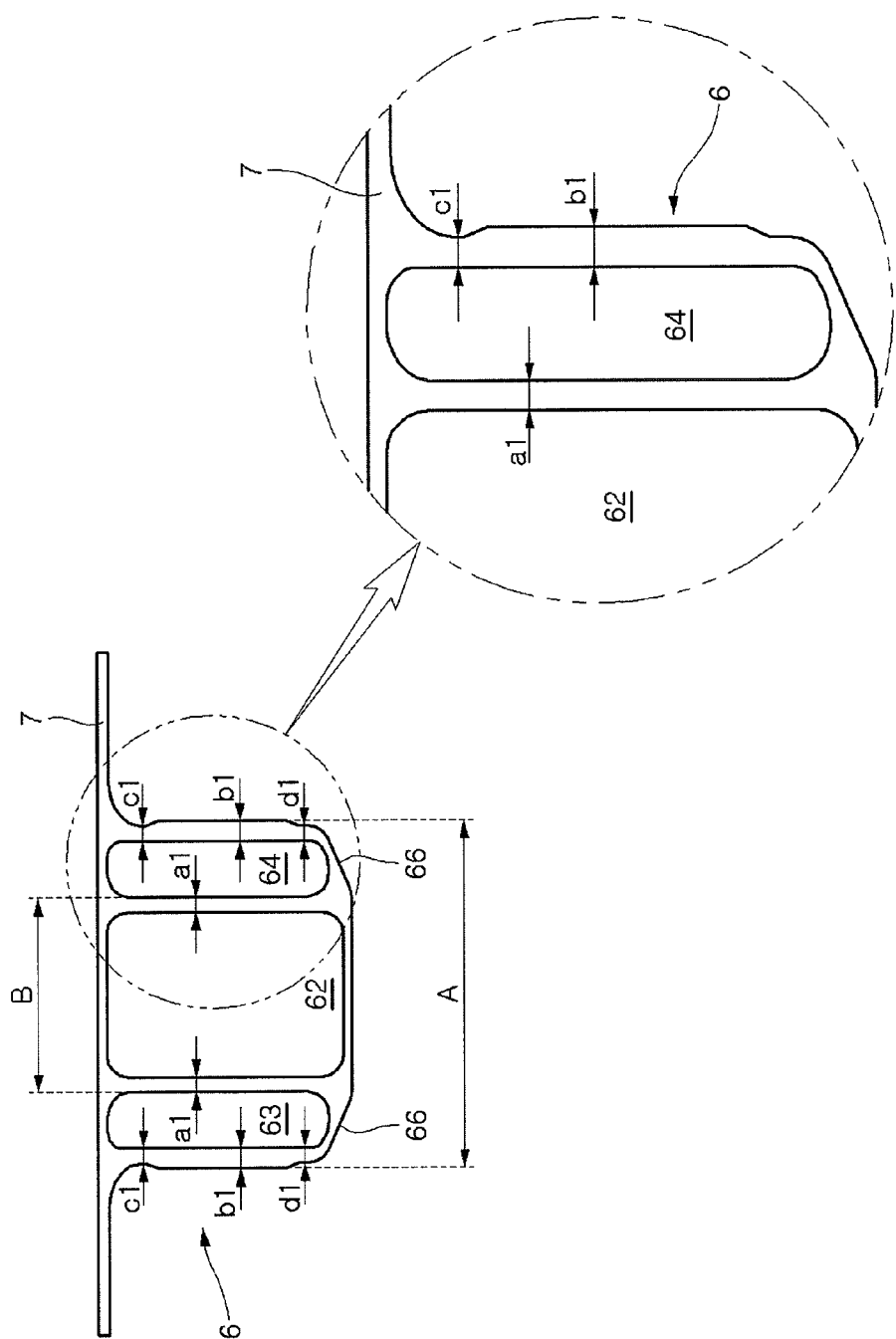
FIG. 3 is a cross-sectional view showing the extrusion profile of the double closed-cross section hollow-typed control arm where the variable curvature extruding process is applied according to the invention.

Further, as shown in FIG. 3, carrier fastening end 8 has the same width as the entire width (A) of body plate 6 and bush fastening end 9 has the same width as the width (B) of the inside closed cross section of body plate 6, extending from body plate 6.

In the double closed profile cross section of body plate 6 of the control arm, as shown in FIG. 3, both left and right sides, which form left and right cavities 63, 64 from a main cavity 62 having a closed space therein, each have a closed space of the same width, such that closed spaces having double sides are formed at both sides inside body plate 6.

The width (B) of main cavity 62 is the same as the width of bush fastening end 9 formed at an end of the control arm and the width (A) between left and right side cavities 63, 64 including main cavity 62 is the same as the width of carrier fastening end 8 formed at the opposite side to bush fastening end 9 of the control arm.

In addition, both outer sides of body plate 6 is inclined by forming slopes 66 at lower end of the outer sides of left and right cavities 63, 64 that form both sides of main cavity 62.

Further, in the thickness of the control arm, the entire thickness of body plate 6 is set to 2.5 mm to reduce the weight of the product, while main cavity 62 and left and right cavities 63, 64 that making the closed hollow structure with double walls have various thicknesses.

For example, a main reference thickness $(a_1)$ of the wall separating main cavity 62 from left and right cavities 63, 64 is set to about 3.0 mm, whereas the side reference thickness $(b_1)$ forming the outer walls of left and right cavity 63, 64 is set to about 4.0 mm.

Further, a rounded-connecting portion of base plate 7 and body plate 6 has a connection neck thickness $(c_1)$, which is rounded to have 2.5 mm thickness smaller than the thickness of 4.0 mm of the outer walls of left and right cavities 63, 64.

In addition, the opposite side to the rounded-connecting portion of base plate 7 and body plate 6 has also an outer wall neck thickness $(d_1)$ that is smaller than the thickness of the outer walls of left and right cavities 63, 64, and outer wall neck thickness $(d_1)$ is set to 2.5 mm smaller than the thickness of 4.0 mm of the outer walls of left and right side cavities 63, 64.

As described above, since the cross section profile of body plate 6 is formed in the double-hollow closed cross section in the extruding of the control arm and the thickness of the inner walls are larger than the thickness of base plate 7, it is possible to increase the entire durability of the control arm even if a large load is applied, by body plate 6 where the spring fastened by bump stop cup 10 is placed.

The difference in thickness in the control arm, considering body plate 6 and base plate 7, depends on specifications of vehicles, and the design value that maximizes the productivity of the control arm in forming is experimentally determined.

Relative to the thicknesses of body plate 6 and base plate 7, bush fastening end 9 has a thickness of at least 3.0 mm and carrier fastening end 8 has a thickness of at least 3.5 mm or more to increase the entire durability of the control arm.

The thickness of 3.0 mm of bush fastening end 9 is for securing the fitting force and separating force of the bush when assembling the bush, which can keep the bush separating force (the lowest load that separates the bush fitted in the control arm) at least above 9.8 KN, even though the bush is strongly fitted in the fastening portion of the control arm.

Further, the thickness of 3.5 mm of carrier fastening end 8 is determined in consideration of assembly of the bolts and nuts for fastening the carrier and sufficient durability against load transmitted to the car body, and prominence and depression structure is formed to increase the durability.

What is claimed is:

1. A double-hollow type control arm manufactured by variable curvature extrusion molding, comprising:
    a base plate that is connected with a bump stop cup, a lower end of a spring being positioned on the bump stop cup, by caulking;
    a body plate that integrally protrudes from the base plate and has a closed hollow profile cross section with double walls therein, the double walls being defined by a main cavity having a closed inner space and left and right cavities formed at left and right sides of the main cavity, the left and right cavities having the same width;
    a carrier fastening end that is composed of a pair of flanges that extend from the body plate and are spaced apart from each other when the base plate is not connected to another member; and
    a bush fastening end that is composed of a pair of flanges that are spaced apart from each other and formed by integral connection of the base plate and the body plate, at a side opposite to the carrier fastening end,
    wherein the main cavity has the same width as the width of the bush fastening end and the width between left and right cavities including the main cavity is the same as the width of the carrier fastening end.

2. The double-hollow type control arm as defined in claim 1, wherein slopes are provided at a lower end of the outer sides of the left and right cavities that form both sides of the main cavity to incline both outer sides of the body plate.

3. The double-hollow type control arm as defined in claim 1, wherein a main reference thickness of the walls separating the main cavity from the left and right cavities is smaller than a side reference thickness of outer walls of the left and right cavities.

4. The double-hollow type control arm as defined in claim 3, wherein portions of the left and right cavities connected with the base plate are rounded and have a connection neck thickness that is smaller than the thickness of the outer walls of the left and right cavities.

5. The double-hollow type control arm as defined in claim 4, wherein the opposite sides to the base plate of the left and right cavities have an outer wall neck thickness that is smaller than the thickness of the outer walls of the left and right cavities.

6. The double-hollow type control arm as defined in claim 1, wherein the base plate has a thickness smaller than the thickness of the body plate.

7. The double-hollow type control arm as defined in claim 1, wherein the bush fastening end has a thickness larger than the base plate and smaller than the carrier fastening end.

* * * * *